United States Patent
Canti

(10) Patent No.: US 11,535,753 B2
(45) Date of Patent: Dec. 27, 2022

(54) NATURAL BINDER FOR BINDING ANY KIND OF BIOMASS AND COUNTLESS WASTE MATERIALS, AND COMPOSITE MATERIALS OBTAINED THEREBY

(71) Applicant: Enrico Canti, Vallefoglia (IT)

(72) Inventor: Enrico Canti, Vallefoglia (IT)

(*) Notice: Subject to any disclaimer, the term of this patent is extended or adjusted under 35 U.S.C. 154(b) by 519 days.

(21) Appl. No.: 16/484,175

(22) PCT Filed: Feb. 10, 2017

(86) PCT No.: PCT/IB2017/050744
§ 371 (c)(1),
(2) Date: Aug. 7, 2019

(87) PCT Pub. No.: WO2018/146517
PCT Pub. Date: Aug. 16, 2018

(65) Prior Publication Data
US 2020/0024453 A1    Jan. 23, 2020

(51) Int. Cl.
| | | |
|---|---|---|
| *C08L 89/00* | (2006.01) | |
| *C08K 3/013* | (2018.01) | |
| *C08K 5/092* | (2006.01) | |
| *C08L 89/04* | (2006.01) | |
| *C08K 3/22* | (2006.01) | |

(52) U.S. Cl.
CPC ............ *C08L 89/005* (2013.01); *C08K 3/013* (2018.01); *C08K 5/092* (2013.01); *C08L 89/04* (2013.01); *C08K 2003/222* (2013.01); *C08L 2312/00* (2013.01)

(58) Field of Classification Search
None
See application file for complete search history.

(56) References Cited

U.S. PATENT DOCUMENTS

| | | | | |
|---|---|---|---|---|
| 4,836,855 A | * | 6/1989 | Caillau | C04B 24/14 106/655 |
| 4,996,065 A | * | 2/1991 | Van de Walle | A23K 40/20 426/74 |
| 9,034,228 B2 | * | 5/2015 | De Bruyn | C09K 17/28 264/109 |
| 2014/0238266 A1 | | 8/2014 | Canti | |

FOREIGN PATENT DOCUMENTS

| | | | | |
|---|---|---|---|---|
| CN | 102850941 B | * | 9/2013 | |
| EP | 2163590 | | 3/2010 | |
| FR | 2541991 A1 | * | 9/1984 | C04B 24/14 |
| JP | 52151756 A | * | 12/1977 | |
| WO | 2006132785 | | 12/2006 | |

OTHER PUBLICATIONS

FR-2541991-A1—english translation (Year: 1983).*
JP-52151756-A, English translation (Year: 1977).*
CN-102850941-B—English translation (Year: 2013).*

* cited by examiner

*Primary Examiner* — Stefanie J Cohen
(74) *Attorney, Agent, or Firm* — Themis Law

(57) ABSTRACT

A natural binder for binding biomasses and industrial waste and/or recycled materials, using processes employed for petroleum-derived binders, includes a mixture of a protein flour, a plant hydrolyzate, and a magnesium oxide.

14 Claims, No Drawings

NATURAL BINDER FOR BINDING ANY KIND OF BIOMASS AND COUNTLESS WASTE MATERIALS, AND COMPOSITE MATERIALS OBTAINED THEREBY

FIELD OF THE INVENTION

The invention relates to a natural binder for binding any kind of biomass and countless waste products, and composite materials obtained thereby, generally suitable for use in making constructions and eco-friendly products.

BACKGROUND ART

Binders for plant particles have been known and widely used for about 70 years, to form chipboards, MDF panels, HDF panels, oriented strand boards, typically designed for building.

These binders are petroleum derivatives and are highly toxic for both operators and users, and their end-of-life disposal is of great environmental concern, due to their harmful components.

The most widespread, low-cost binder is urea-formaldehyde, which typically has no water resistance.

Another type of binder is melamine-formaldehyde, which is waterproof but has a high cost.

Another binder is phenol-formaldehyde, which is as expensive as melamine-formaldehyde, but is even more toxic and harmful, due to the generation of phenol during processing.

Recent high-cost binders are also known, such as di-isocyanate and bi-component polyurethane pre-polymers, which are even more difficult to use, as they require closed protective systems during manufacturing and generate cyanide in case of fire.

Through the years a number of attempts have been made to create a natural binder that might replace the expensive milk or blood casein, using a plant casein and treating it like milk or blood casein with an alkaline or alkaline-earth hydroxide, or with ammonia.

Nevertheless, the binder has shown poor water resistance.

Further attempts have been made to impart water resistance to such natural binder, using chemicals such as formaldehyde or chemicals that release formaldehyde under heat, or adding phenol-formaldehyde, or even humic acids combined with lignin or tannins, obtained by cellulose hydrolyzation with acid-based chemical processes, combined with chemical and thermal treatments.

Nevertheless, no appreciable results have been attained in terms of mechanical strength and/or water resistance, that might be compared with those of chemical binders obtained from melamine-formaldehyde, phenol-formaldehyde, MDI, bi-component polyurethanes, therefore any attempt of producing a totally natural binder at a low cost, similar to that of urea-formaldehyde, failed.

As of 1st Apr. 2015, the European Community has classified formaldehyde as carcinogenic, under class 1/B, whereby any production plant that employs this element requires a "closed system", to limit exposure of operators to this substance. Therefore, a novel and non-toxic natural binder is needed, that might replace, even in a cost-beneficial manner, a known and less expensive binder such as urea-formaldehyde, while providing the typical water resistance properties of binders having higher costs, such as melamine-formaldehyde, phenol-formaldehyde and polyurethane binders.

The binder of the invention meets this requirement and the end-of-life disposal of the conglomerates and products obtained thereby will provide, by composting, a nutrient-rich humus material to be used as a fertilizer in agriculture.

The conglomerates obtained using the novel binder of the invention are of plant origin, endure multiple boiling and drying cycles without disintegrating and the moderate dilation caused by water absorption by any fiber left exposed by the binder, may be compensated for by a drying step.

DISCLOSURE OF THE INVENTION

One object of the invention is to improve the prior art.

A further object of the invention is to provide a natural binder for binding any kind of biomass and countless waste products, as well as composite materials obtained thereby, that are entirely nature, have a low cost and is water-resistant and resistant to the washing away action.

In one aspect the invention relates to a natural binder for binding any kind of biomass and countless waste products and composite materials obtained thereby as defined in claim 1.

Further aspects of the invention are defined in the dependent claims.

The invention affords the following advantages:

Providing a wholly natural and environment-friendly binder;

Making products, typically intended for building use, that are highly resistant to both water and mechanical stresses, using industrial waste products;

Using the products and conglomerates obtained using the binder of the invention, after end-of-life disposal, as fertilizers;

Simplifying disposal of the products obtained using the binder of the invention;

Avoiding the use of complex and expensive "closed systems" in industrial production cycles.

PREFERRED EMBODIMENT

Further characteristics and advantages of the invention will be more apparent from the detailed description of a preferred, non-exclusive embodiment of a natural binder for binding any kind of biomass and countless waste products.

The binder of the invention comprises a mixture of at least three components.

A first component of the binder of the invention is a protein flour which increases the protein content, i.e. a raw soybean flour having a main protein content of about 36% to 45%, and an unsaturated and polyunsaturated fat content of about 30%.

Alternatively, the raw soybean flour may be replaced by other plant-based protein flours such as, without limitation, fava bean, pea, chick-pea, bean, lentil, peanut, spirulina flours or animal protein flours, such as byproducts of meat and leather processing or fish product processing waste. In one embodiment, the protein flour comprises flour of protein-only seeds coming from Paneli, an agglomerate of solid and ground residues obtained from mechanically squeezed seeds.

Raw soybean flour is contained in the binder mixture in an amount of 10% to 70% by weight, preferably 43.75%.

A second component is a water-free liquid plant hydrolyzate having a density of 1300 Kg/m$^3$, and an acid pH, for example, pH=4.5, obtained from demolition of cellulose.

An example of liquid plant hydrolyzate is produced by Società Bioiberica, and is derived from demolition of sugarcane bagasses remaining from sugar extraction, having large amounts of fulvic acids (23%) and large amounts of proteins (18.75%) and a small amount of humic acids (2%) which does not affect water resistance. More generally, a liquid plant hydrolyzate may include, by weight, fulvic acids between 22% and 24% humic acids between 1% and 3%, and protein between 18% and 19%.

The first two components are chemically reactive, fulvic acids due to their property of containing carboxy groups, aldehyde and ketone groups, phenol groups, quinone groups and proteins for their property of containing two functional groups, namely amide groups (—NH2) and the acidic group (—COOH), which increase the protein content of soybean.

Laboratory tests conducted during the formation of the natural binder of the invention showed that the addition of a greater amount of humic acids as compared with that in the natural enzyme product as mentioned above, led to a decrease of water resistance of the binder of the invention, because humic acids are soluble in the original acidic environment but are insoluble in a basic environment.

Therefore, the presence of larger amounts of these humic acids involve a decreased amount of the other components that are soluble and reactive in a basic environment.

60% to 25% by weight, preferably 37.51% of this second ingredient, i.e. the plant-derived enzymatic hydrolyzate, is added to the mixture.

The plant hydrolyzate is also available as a 100% water-soluble powder.

The fulvic acids in the plant hydrolyzate have the characteristic of having carboxy groups, phenol groups, quinone groups, aldehyde groups, ketone groups and a number of acidic groups: all these groups are highly reactive and can crosslink with many substances, such as the amino acids and the mono- and poly-unsaturated fatty acids contained in the first component, i.e. the soybean. In the alternative, the hydrolyzed vegetable may be replaced by products containing fulvic acids.

A third component is an alkaline earth metal oxide, preferably magnesium oxide, obtained by burning limestone at temperatures ranging from 550 to 650° C.

Magnesium oxide is highly reactive and may be contained in the binder mixture in an amount from 30% to 5% by weight, preferably 18,75%. The magnesium oxide may include light, reactive magnesium oxide.

Magnesium oxide is the binder activator because it forms magnesium hydrate (or brucite) in the presence of water, which will provide a strongly basic environment, in which the proteins of the hydrolyzate, added to soybean proteins, enter into a solution and interact with one another, thereby creating aminoplast chains.

Furthermore, the proteins of the hydrolyzate crosslink with fulvic acids which also enter into a solution in a basic environment, unlike humic acids which are soluble in an acidic environment.

As an alternative to magnesium oxide, anhydrous magnesium hydrate may be used, or hydrates of other alkaline earth elements, possibly in combination with an oxide, e.g. a calcium oxide combined with a calcium hydrate.

The starches and pectins typically contained in soybean are also hydrolyzed in the basic environment created by the magnesium hydrate, which leads to the formation of hexose and pentose sugars, which also have a high chemical reactivity.

The unsaturated carbon to carbon bonds of the mono- and poly-unsaturated fatty acids contained in the soybean or in other plant-derived protein flours are epoxidized and create complex crosslinking, e.g. as is typical in the formation of Linoleum® or natural drying varnishes.

The binder of the invention may be also formed using other alkaline earth oxides or hydrates, as an alternative to magnesium oxide or hydrate, such as calcium, barium, strontium, with the exception of beryl, which has different properties and radium, which is radioactive, as well as alkaline oxides or hydrates, such as lithium, potassium, sodium.

Alkaline earth oxides or hydrates, such as magnesium, calcium, barium, strontium, are preferred, because they form insoluble soaps in combination with the mono- and poly-unsaturated fatty acids of soybean.

Water may be added to the binder of the invention, to fluidize it as needed, such that it may be dispersed in biomasses (e.g. vegetable fibers and/or wood particles) and also dispersed in manufacturing processes that use pressure and heat. A fluidizing fluid may be added in an amount between 50% and 150% by weight.

In the embodiment of the binder of the invention, water was added in an amount of 100% by weight.

Excipients may be also added, in the formation of the binder, to modify its viscosity and density and increase its impermeability and fire resistance, such as inert fillers, dyes, antiseptics, water-repellents, flame retardants.

The amount of binder that may be used in loose particle binding processes, i.e. when forming products, may range, considering the three components as described above, without water, from 5% to 100% by weight and above based on the amount of particles to be bound, according to the desired final physical properties, e.g. sufficient water resistance and/or perfect waterproofness of the products obtained therewith.

The binder of the invention may be fluidized and may be used, in this fluidized state, for instance, in papermaking industry for producing conglomerates comprising layered sheets of Kraft paper to form High Pressure Laminates (HPL), by replacing the phenol-formaldehyde impregnating resin that is currently used.

Thus, completely biodegradable conglomerates, here HPLs, may be formed.

In the process of application of the natural binder of the invention, temperatures, pressures, times do not substantially differ from those of prior art processes that use petroleum-derived binders, whereby existing plants may be used for the production cycles.

According to the particular temperature, pressure and time parameters, complex crosslinking of amino acids (polyamides), phenoplasts and organic magnesium chelating products may be obtained.

The natural binder of the invention cures in a few seconds with the combined action of heat and removal of any added water to be dispersed into the particles, such that conglomerates (wood fibers) are formed at high temperatures, of the order of 230-240° C., as is typically used in binding processes.

Conversely, low-formaldehyde chemical binders, such as soybean and magnesium oxide or calcium oxide binders, require a few minutes.

Due to such quick curing property, when using the natural binder of the invention in a prior art plant that usually employs urea-formaldehyde binders, considerable greater amounts of conglomerates, i.e. final products, can be obtained.

The binder of the invention differs from natural binders obtained from soybean proteins in that linear amino acid polycondensation reactions only occur in the latter, according to the following reaction:

Where "R" and "R" designate respective radicals.

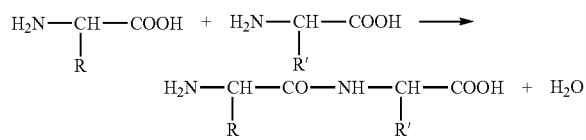

Due to the addition of a third component, namely the plant hydrolyzate deriving from demolition of cellulose, the binder of the invention both affords a considerable increase of amino acids and contains fulvic acids.

The latter are not single acids, but a complex mixture of different acids, in which the amide moiety of the amino acid molecule of the protein is bound, and which also contain carboxy, phenol and quinone, aldehyde, ketone groups, reactive sugars.

For this reason, the fulvic acid contained in the plant hydrolyzate behaves like a ditropic (and also tritropic) acid, with the ability of changing, altering, combining or interacting actually with all the other organic and inorganic substances, thereby allowing quick and complex curing having a high mechanical strength, that can reduce particle (wood fiber) binding times as compared with the processes that use petroleum-based synthetic binders.

A chemical structure model of a fulvic acid will be illustrated below by way of example, in which multiple acidic functional groups (—COOH) are shown, that can bind the amide moiety of the proteins in the binder, thereby providing complex crosslinking.

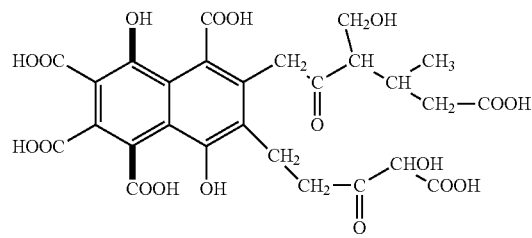

The use of raw soybean flour instead of soybean crushing residue after oil extraction (the so-called oil cakes), like in the prior art, will cause the binder of the invention to also contain mono- or poly-unsaturated fatty acids, which capture the oxygen between unsaturated carbon to carbon bonds, thereby creating highly reactive epoxy groups, which also contribute to the complex crosslinking reaction of fulvic acids and crosslink with themselves, whereas the acidic radicals thereof chelate the inorganic magnesium element or other alkaline earth metals, thereby also imparting an appreciable fire resistance to conglomerates.

The binder of the invention may be advantageously employed in waste wood, while removing the high free formaldehyde content thereof.

The water-dispersed binder of the invention is obtained by dispersing first the alkaline earth powder and then the protein flour in water.

Then, the plant hydrolyzate is added, by intimately mixing the compound and obtaining the binder.

The latter may be subsequently added to the wood particles to be bound, in a mixer; the impregnated wood particles are then exposed to the action of heat and pressure for a few seconds or a few minutes, according to the selected temperatures.

The binder of the invention may be also obtained by dispersing a soluble protein flour in water, adding the alkaline activator and the plant hydrolyzate.

The natural binder is in the form of a solution and may be used in the impregnation of kraft paper and later drying thereof, lamination of multiple dry sheets of kraft paper impregnated with the binder and exposure thereof to the action of pressure and heat for a given time, of the order of a few seconds or a few minutes, according to the selected temperatures, to thereby obtain a HPL.

The binder of the invention has been found to fulfill the intended objects, and particularly has the same low cost as a prior art urea-formaldehyde binder, while imparting a water resistance that might be only achieved with prior art toxic, high-cost binders.

The binder of the invention is also renewable, sustainable, biocompatible, free of formaldehyde and other elements that are toxic to operators and users, as well as totally independent of petroleum derivatives and environment-friendly.

The binder of the invention can be used in the processes employed in current plants, while reducing manufacturing times and increasing throughput.

The binder of the invention can be employed in gluing veneers or laminates on chipboards, forming plywood panels or blockboards, forming OSB, forming hollow-core boards, forming insulating fiberboards, forming MDFs and HDFs, finger-jointing timber pieces, forming wooden load-bearing walls for building such as those known as "ligno-lam", forming beams and trusses and bearing structures in building, thereby providing truly biological wooden houses, unlike prior art ones that contain toxic petroleum-derived glues.

The invention claimed is:

1. A natural binder, comprising:
   a mixture of three components comprising a protein flour, a vegetable hydrolyzate, and a magnesium oxide,
   wherein said vegetable hydrolyzate comprises in weight: fulvic acids from 22% to 24%, humic acids from 1% to 3%, and protein from 18% to 19%.

2. The natural binder as claimed in claim 1, wherein said protein flour is a protein flour of vegetable origin, or a protein flour of animal origin.

3. The natural binder as claimed in claim 2, wherein said protein flour of vegetable origin is a vegetable protein flour soy, peas, or beans.

4. The natural binder as claimed in claim 2, wherein said protein flour of animal origin is casein, fish, or flour derived from processing waste of food proteins.

5. The natural binder as claimed in claim 1, wherein said protein flour comprises flour of protein-oily seeds coming from Paneli.

6. The natural binder as claimed in claim 1, wherein said vegetable hydrolyzate is in a 100% soluble powder state or in a liquid state free of water, said vegetable hydrolyzate having a density of 1,300 kg/m$^3$ and an acid pH.

7. The natural binder as claimed in claim 1, wherein said hydrolyzed vegetable is alternately replaced by products containing fulvic adds.

8. The natural binder as claimed in claim 1, wherein said vegetable hydrolyzed is in an amount by weight included between 60% and 25%.

9. The natural binder as claimed in claim 1, wherein said magnesium oxide includes light, reactive magnesium oxide.

10. The natural binder as claimed in claim 1, wherein said magnesium oxide is in an amount by weight included between 30% and 5%.

11. The natural binder as claimed in claim 1, wherein said magnesium oxide is alternatively replaced with an alkaline earth oxide.

12. The natural binder as claimed in claim 1, further comprising a fluidizing fluid in an amount by weight included between 50% and 150%.

13. The natural binder as claimed in claim 12, wherein the fluidizing fluid includes a dispersed alkaline substance, a powder soluble protein, a vegetable hydrolyzate, or a liquid, powder or gel product containing a percentage of fulvic acids adapted to cause crosslinking.

14. The natural binder as claimed in claim 1, further comprising a modifying excipient of one or more of a density, coloration, water resistance, or fire resistance of a conglomerate, the modifying excipient being selected from the group consisting of inert fillers, dyes, water repellents, flame retardants, and antiseptics.

\* \* \* \* \*